United States Patent
Yamamoto et al.

[11] Patent Number: 5,848,517
[45] Date of Patent: Dec. 15, 1998

[54] WEB HEATING DEVICE

[75] Inventors: Hidekimi Yamamoto; Fumiyuki Iwano; Kojiro Hayashi; Michio Ueda, all of Tokushima, Japan

[73] Assignee: Shikoku Kakoki Co., Ltd., Tokushima, Japan

[21] Appl. No.: 884,140

[22] Filed: Jun. 27, 1997

[30] Foreign Application Priority Data

Jun. 28, 1996 [JP] Japan ..................................... 8-169291

[51] Int. Cl.$^6$ ........................ B65B 51/26; B65B 51/20; B65B 9/20
[52] U.S. Cl. ........................ 53/551; 53/375.9; 53/376.2; 156/496; 493/302
[58] Field of Search .............................. 53/550, 551, 552, 53/375.9, 376.2, 373.9; 156/466; 493/302

[56] References Cited

U.S. PATENT DOCUMENTS

| | | | |
|---|---|---|---|
| 2,899,875 | 8/1959 | Leasure .................................. | 53/551 X |
| 3,086,336 | 4/1963 | Rausing et al. ........................ | 53/551 X |
| 3,562,920 | 2/1971 | Vuilleumier et al. ............... | 53/373.9 X |
| 3,884,746 | 5/1975 | Loliger et al. ......................... | 53/551 X |
| 3,925,963 | 12/1975 | Greenawalt ................................ | 53/552 |
| 4,103,473 | 8/1978 | Bast et al. .................................. | 53/551 |
| 5,562,795 | 10/1996 | Landrum et al. ................... | 53/373.9 X |

FOREIGN PATENT DOCUMENTS

| | | |
|---|---|---|
| 4-51138 | 12/1992 | Japan . |
| 1195578 | 6/1970 | United Kingdom . |

*Primary Examiner*—Horace M. Culver
*Attorney, Agent, or Firm*—Armstrong, Westerman, Hattori, McLeland and Naughton

[57] ABSTRACT

For use in forming a web W into a tubular shape, and heat-sealing an inner surface of outer edge of the web and an outer surface of inner edge of the web to provide a lap, a web heating device for heating the outer edge inner surface of the web with hot air before heat-sealing comprises transport means for transporting the web W along a predetermined path, a nozzle 27 having hot air outlet openings 67 directed outward as opposed to the outer edge inner surface of the web W to be transported by the transport means, and a baffle plate 32 so disposed as to be opposed to the hot air outlet openings 67 with the outer edge of the web W positioned therebetween.

6 Claims, 5 Drawing Sheets

WEB HEATING DEVICE

BACKGROUND OF THE INVENTION

The present invention relates to web heating devices, and more particularly to a device for use in packaging machines for making a web of packaging material into closed rectangular parallelepipedal containers filled with contents, the device being useful in forming the web into a tubular shape and heat-sealing an outer edge of the web and an inner edge thereof opposed thereto face-to-face for heating the inner surface of the outer edge of the web with hot air.

Conventional devices of the type described include those which comprise, as disclosed for example in Japanese Utility Model Publication 4-51138/1992, transport means for transporting a web along a predetermined path, a nozzle having hot air outlet openings directed outward as opposed to the inner surface of outer edge of the web to be transported by the transport means, a roller of large diameter for guiding the outer edge of the web so that the outer edge inner surface of the web to be heated moves outwardly of the nozzle across a current of hot air from the nozzle perpendicular thereto to ensure heating of the inner surface to a uniform temperature , and a roller of small diameter for guiding an inner edge of the web so that the outer surface of the inner edge moves inwardly of the nozzle as spaced apart from the nozzle. The transport means comprises a roller having the web reeved therearound and disposed on the path upstream from the nozzle with respect to the direction of transport of the web. The rollers and the nozzle are housed in an aseptic chamber.

The large-diameter roller is exposed at all times to the hot hair forced out from the nozzle and having a high temperature (270 deg C). Accordingly, there is the likelihood that when the outer surface of outer edge of the web comes into contact with the roller which is heated, polyethylene on the web will adhere to the hot roller, forming a protuberant accumulation thereon, The device will then become inoperative or produce faulty packages (with the print peeling off).

When the web is to be halted during transport with the operation of the device interrupted, the device is moved away from the path of transport of the web so as not to expose the web to hot air. In this case, the large-diameter roller becomes heated more readily because the roller is held out of rotation as spaced apart from the web and also because the roller is brought out of contact with the web, with the result that the above problem is liable to occur when the device is started again with the large-diameter roller brought into contact with the web.

With the device described, the hot air forced out from the nozzle strikes against the outer edge inner surface of the web to heat this portion and thereafter flows straight, spreading out in the surroundings. Consequently, the web is heated unevenly, such that at the web portion overheated, the surface of the resin layer of the web is liable to bulge out thermally, altering the thickness of the laminated material over the web surface to form a surface layer of uneven thickness and possibly creating a portion where no resin is visible. Thus, the device fails to seal the web with good stability.

Furthermore, the hot air forced out from the nozzle and having a high temperature inevitably raises the internal temperature of the aseptic chamber, consequently elevating the temperature of rollers within the aseptic chamber which are not associated directly with the heat-sealing operation and entailing the problem that the resin of the web becomes melted by contact with the roller and adheres to the roller.

SUMMARY OF THE INVENTION

An object of the present invention is to provide a web heating device which is free of the foregoing problems.

The present invention provides a web heating device for use in forming a web into a tubular shape, and heat-sealing an inner surface of outer edge of the web and an outer surface of inner edge of the web to provide a lap, the device being operable for heating the outer edge inner surface of the web with hot air before heat-sealing, the web heating device being characterized in that the device comprises transport means for transporting the web along a predetermined path, a nozzle having hot air outlet openings directed outward as opposed to the outer edge inner surface of the web to be transported by the transport means, and a baffle plate so disposed as to be opposed to the hot air outlet openings with the outer edge of the web positioned therebetween.

The web heating device embodying the present invention has a baffle plate which is so disposed as to be opposed to the hot air outlet openings with the outer edge of the web positioned therebetween, so that the hor air forced out from the nozzle comes into contact with the outer edge inner surface of the web to heat this portion, thereafter striking against the baffle plate to remain in the vicinity of the plate and therefore maintaining the ambient temperature around the outer edge of the web at a high level. Thus, the web can be heated with the hot air flowing out from the nozzle and additionally with the hot atmosphere, Accordingly, the outer edge inner surface of the web to be heated can be heated uniformly free of temperature variations without the necessity of positioning the surface orthogonal to the flow of the hot air. This eliminates the need for the large-diameter roller required for the conventional device, obviating the problem due to the adhesion of polyethylene to the roller and ensuring efficient use of the hot air.

Preferably, the web heating device comprises tension means for tensioning the web so that the outer edge of the web can be positioned between, and spaced apart from, the nozzle and the baffle plate.

The tension exerted on the web precludes the web from traveling zigzag or undulating, eliminating the need for the large-diameter roller of the conventional device.

Preferably, the tension means comprises a dancer roller having the web reeved therearound and disposed on the path of transport of the web upstream from the nozzle with respect to the direction of transport.

Preferably, the nozzle and the dancer roller are housed in an aseptic chamber.

The baffle plate ensuring efficient use of the hot air makes it possible to reduce the rate of supply of hot air or the temperature of the air, consequently suppressing the rise in the internal temperature of the aseptic chamber, This prevents the resin of the web from adhering to the dancer roller on melting.

Preferably, the baffle plate is formed with a cutout or a hole for inspecting the web therethrough.

The web is visible through the cutout or hole and can therefore be checked readily as to whether it is in contact with the baffle plate.

DESCRIPTION OF THE PREFERRED EMBODIMENT

An embodiment of the invention will be described below with reference to the drawings.

Figure 2:
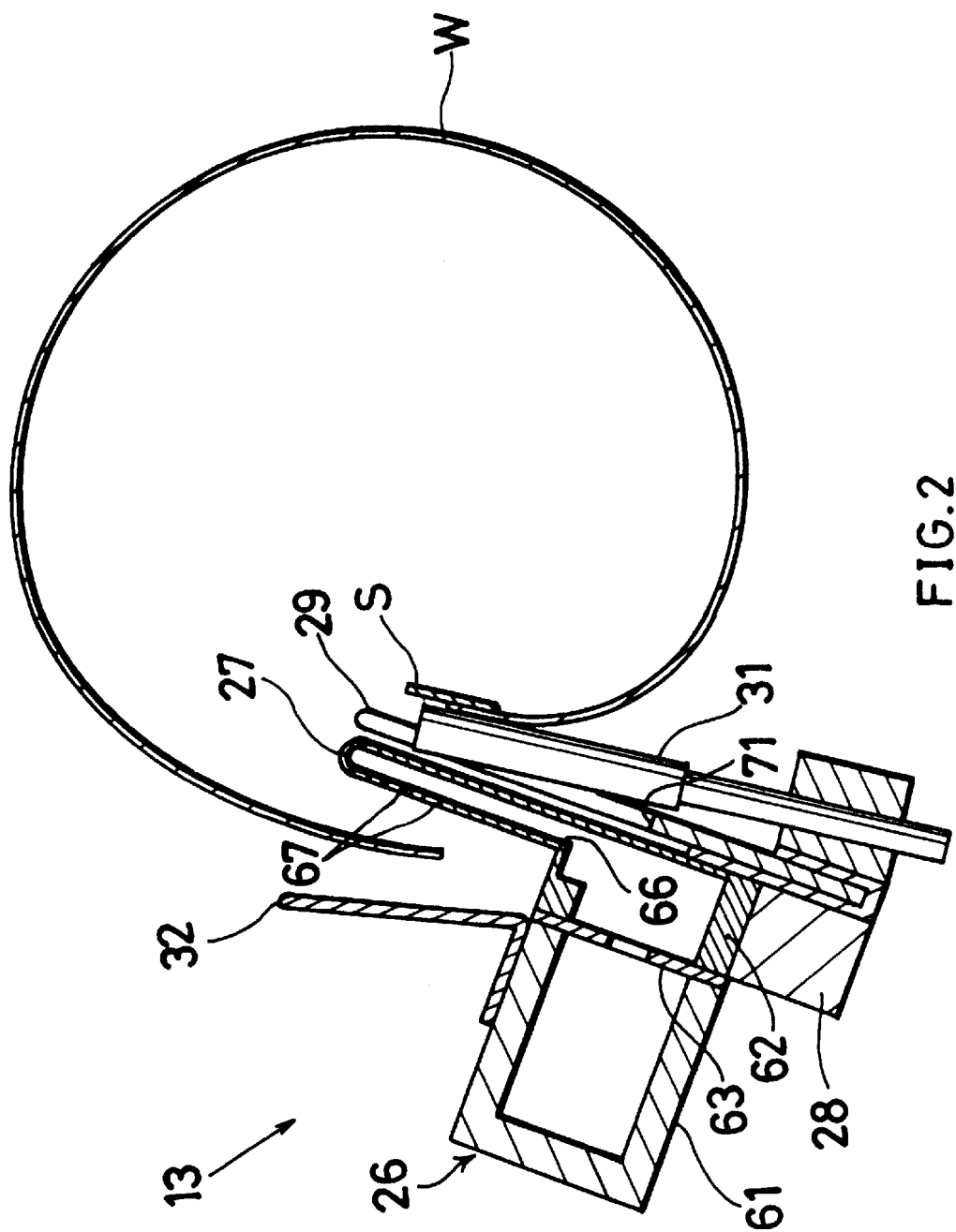
FIG. 2 is a view in horizontal cross section of the heating device.

In the following description, the lower side of FIG. 2 will be referred to as the "front," and the upper side thereof as the "rear," and the right-hand side and the left-hand side thereof as the "right" and "left," respectively.

Figure 1:
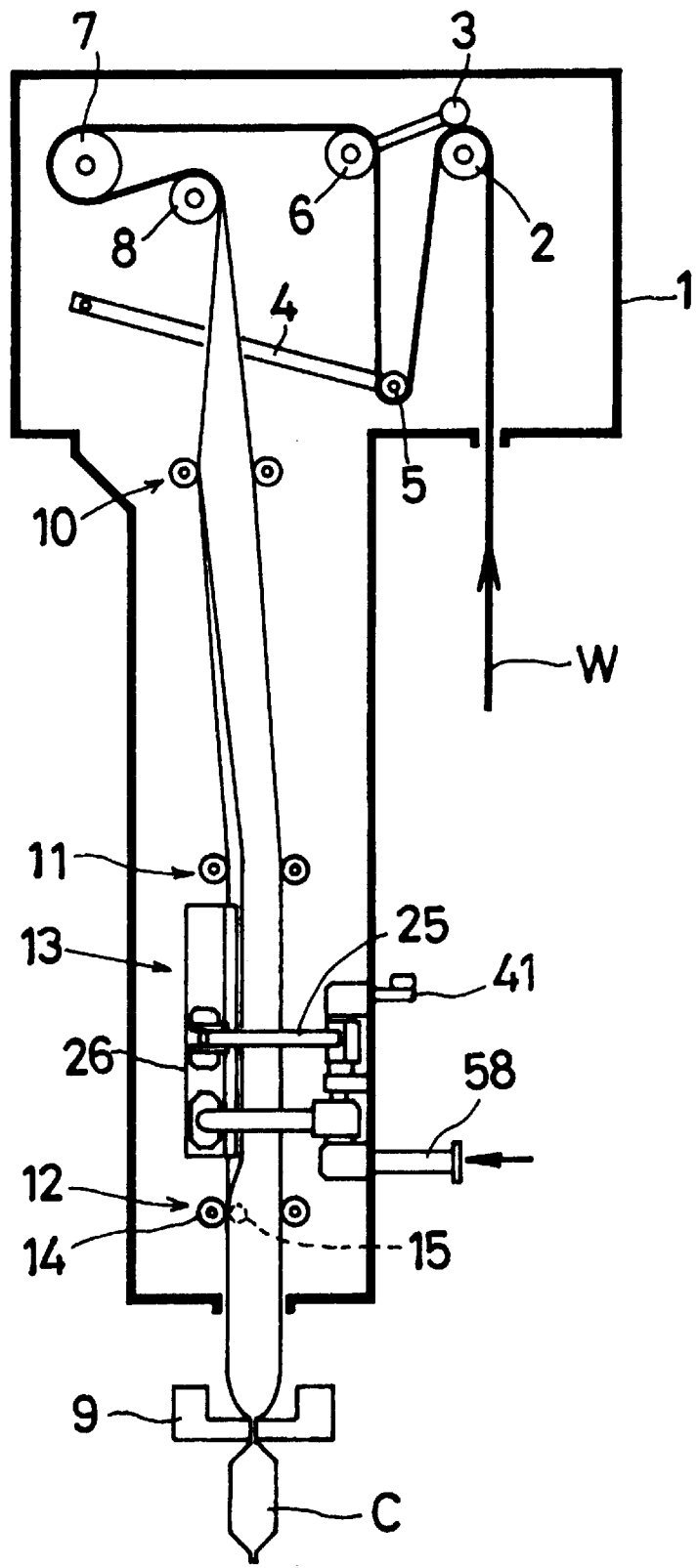
FIG. 1 is a side elevation of a packaging machine including a web heating device of the invention.

FIG. 1 shows how to make pillow-shaped containers C filled with contents from a web W of packaging material having a polyethylene layer over each of its opposite surfaces. A seal tape S for preventing penetration of liquid is affixed to the inner surface of an inner edge portion of the web W (FIG. 2).

Arranged in the interior upper portion of an aseptic chamber 1 are a feed roller 2, holding roller 3, dancer roller 5 mounted on the forward end of a pivotal arm 4 movable upward and downward, bending rollers 6, 7 and zigzag movement correcting roller 8. Arranged below the correcting roller 8 are an upper forming roller ring 10, intermediate forming roller ring 11 and lower forming roller ring 12. A seal roller 15 is disposed is provided as pressed against one roller 14 of the lower forming roller ring 12.

The web W is transported downward from above successively through the upper and intermediate forming roller rings 10, 11, a heating device 13 and the lower forming roller ring 12. While the web W is being thus transported, the web W is formed generally into a tubular shape by the intermediate forming roller ring 11, with the inner surface of outer edge of the web W opposed to the outer surface of inner edge thereof and space apart therefrom by a predetermined distance, hot air is applied to the inner surface of outer edge of the web W by the heating device 13, and the outer edge inner surface of the web W and the inner edge outer surface thereof are heat-sealed by the lower forming roller ring 12 and the seal roller 15 to provide a lap.

The web W formed into a tube is filled with contents by an unillustrated filling pipe and delivered from the aseptic chamber 1. The tubular web W filled with the contents and delivered from the chamber 1 is transported by a length corresponding to one container at a time, and sealed and cut transversely thereof by a container forming device 9 (seal jaws only shown) disposed below the aseptic chamber 1 every time the web is so transported.

The heating device 13 comprises a vertical rotatable shaft 24 supported by upper and lower bearings 22, 23 on the left side surface of a vertical support plate 21 disposed to the right of the path of transport of the web; a horizontal swing arm 25 fixed to an intermediate portion of the length of the shaft 24 and extending from the shaft 24 toward a position in front of the transport path; a hot air chamber 26 having a rectangular horizontal section and in the form of a vertically elongated box, the chamber 26 being attached to the forward end of the swing arm 25, positioned in front of the transport path obliquely leftward therefrom and extending along the path over a required distance; a nozzle 27 generally U-shaped in horizontal section and extending from the right end of rear side wall of the hot air chamber 26 obliquely rightwardly rearward; a heat-insulating plate 29 in the form of a vertical strip and attached to the right end of front side wall of the hot air chamber 26 by a connecting bar 28, the plate 29 being opposed to the right side wall of the chamber 26 and the nozzle 27 and spaced apart from the right side wall by a small distance; three guide rollers 31 mounted on the heat-insulating plate 29 and arranged one above another at a predetermined spacing; and a baffle plate 32 in the form of a vertical strip and attached to the rear side wall of the hot air chamber 26 so as to be opposed the left side wall of the nozzle 27.

Fixed to the upper end of the rotatable shaft 24 is a rightwardly projecting operating arm 41, which has a right end connected to the piston rod 43 of a fluid pressure cylinder 42.

A hot air communication pipe 51 extending toward the hot air chamber 26 has a right end secured to the lower end of the shaft 24. The right end of the pipe 51 is formed with a circular communication hole 52 concentric with the shaft 24. A slip ring 53 has an upper portion fitted in the communication hole 52 and rests on a joint 54. The joint 54 is formed with a hot air channel 55, which has an upward outlet 56 fittingly receiving the lower end of the slip ring 53 and a rightward inlet 57, A hot air supply pipe 58 is connected to the inlet 57.

The hot air chamber 26 comprises a box-shaped body 61 opened rightward and having a large depth, a boxlike cover 62 having a left open side and a small depth, and a flow control plate 63 interposed between the chamber body 61 and the cover 62.

The front side wall of the chamber body 61 is formed with an inlet 65 having the left end of the hot air communication pipe 51 connected thereto. The cover 62 has a rear side wall formed with an outlet 66 in communication with an open end of the nozzle 27.

The nozzle 27 is integral with an edge portion of the cover rear side wall defining the outlet 66. The nozzle 27 has a left side wall formed with a multiplicity of distributed outlet openings 67.

The heat-insulating plate 29 has a length approximately equal to that of the hot air chamber 26. Of the upper, middle and lower guide rollers 31, the middle and lower rollers 31 are fitted respectively in two cutouts 71 formed in the plate 29.

Figure 3:
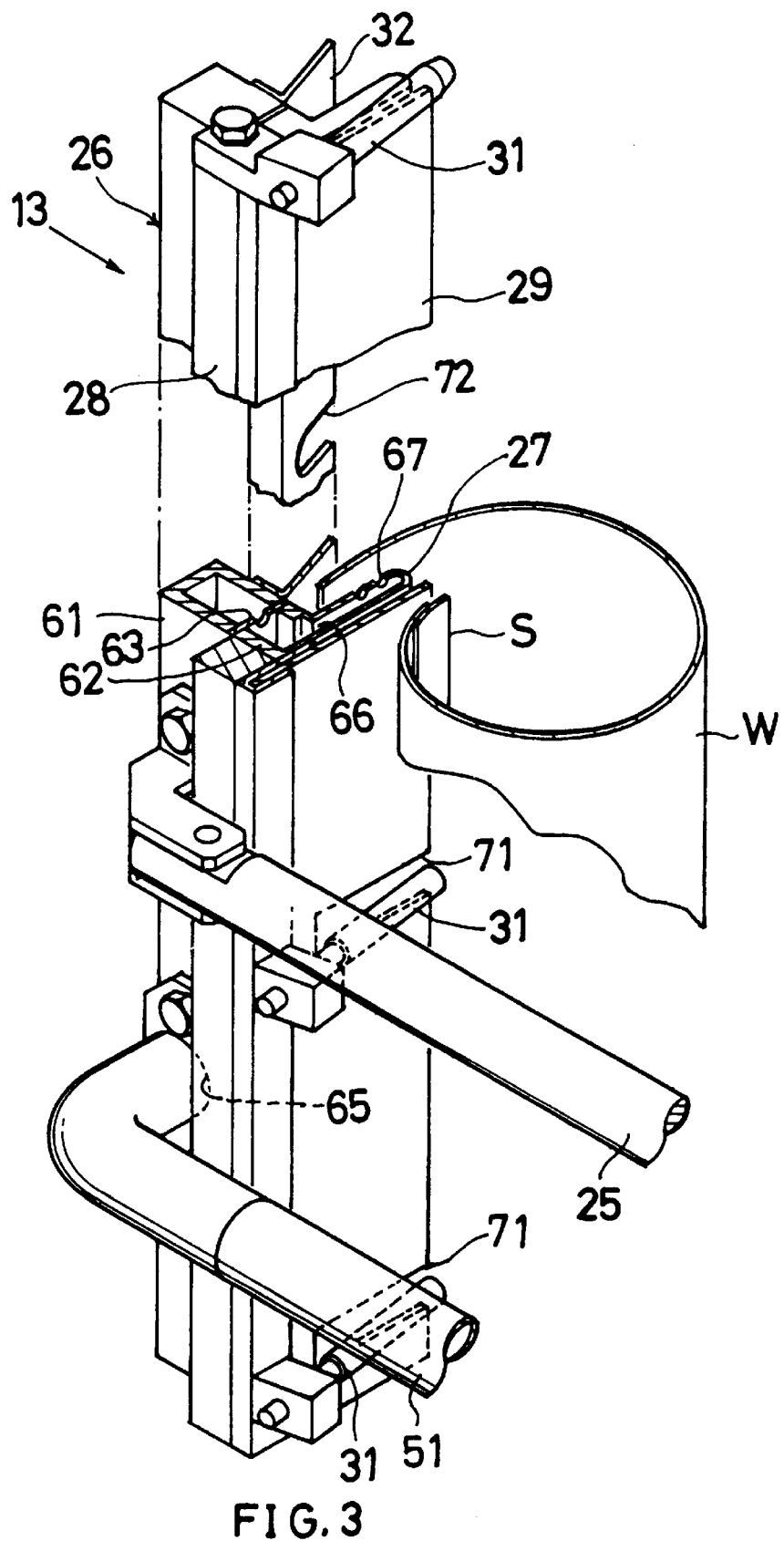
FIG. 3 is a perspective view of the heating device.

The baffle plate 32 is approximately equal to the heat-insulating plate 29 in length, and is inclined relative to the left side wall of the nozzle 27 so as to be positioned at a gradually increasing distance therefrom as its extends rearward. With reference to FIG. 3, the baffle plate 32 is formed with a cutout 72 opened rearward and positioned at an intermediate portion of its length. While being transported, the web w can be inspected through the cutout.

Figure 4:
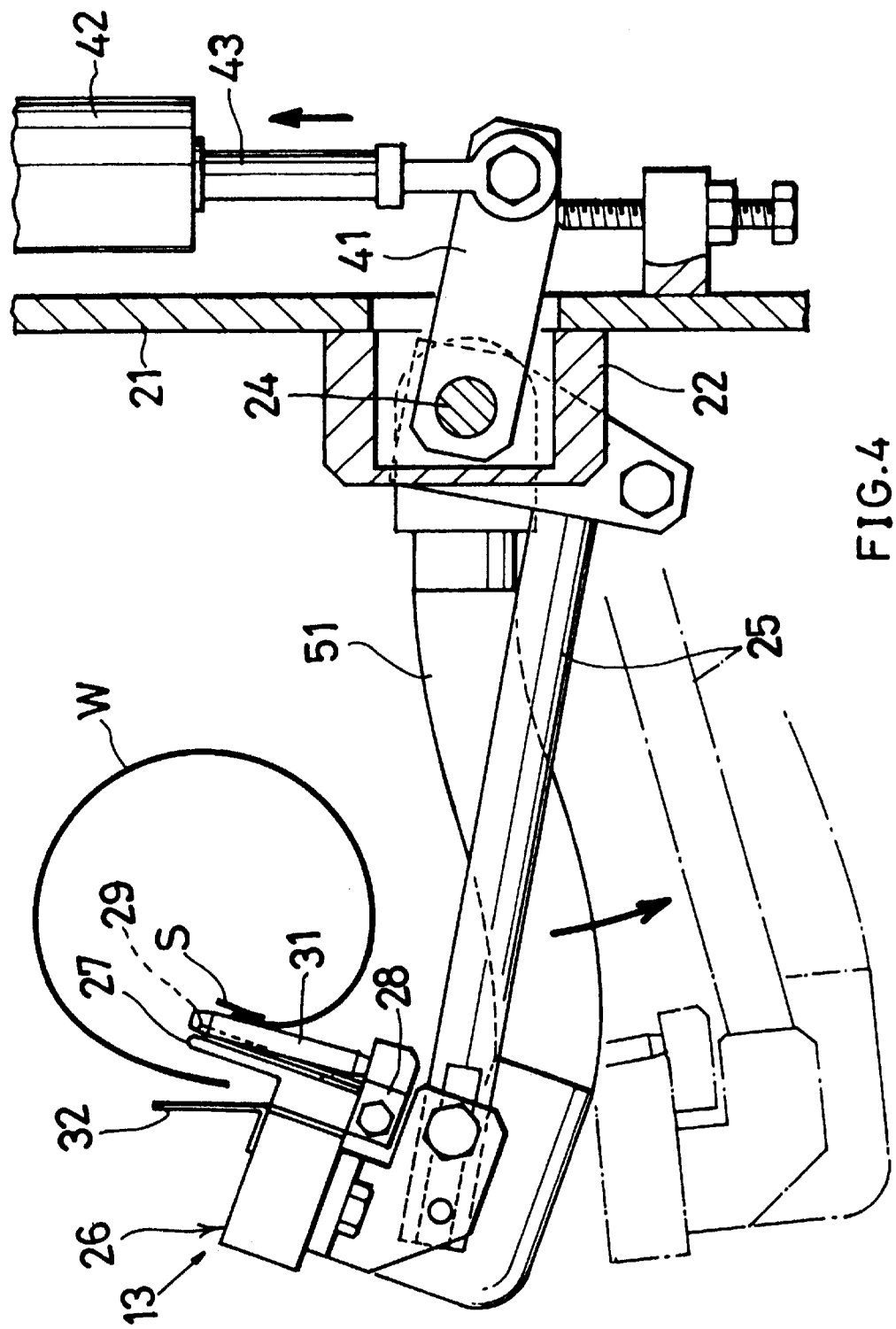
FIG. 4 is a plan view of the heating device.
Figure 5:
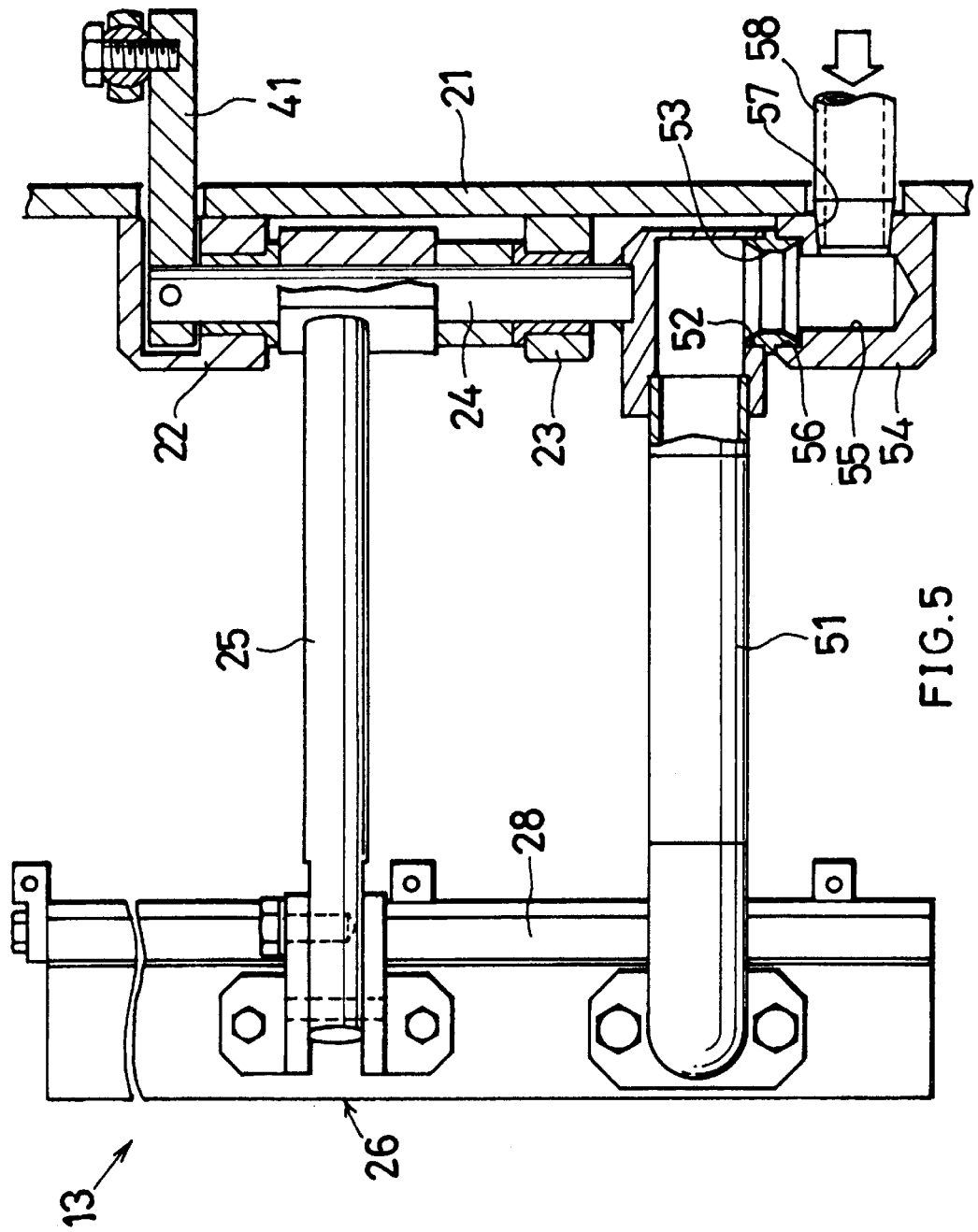
FIG. 5 is a side elevation of the heating device.

FIG. 4 shows in solid lines the present device as positioned during the transport of the web W. During the transport of the web W, the outer surface of inner edge of the web W is brought into contact with the guide rollers 31 and thereby guided. On the other hand, the outer edge of the web W is held out of contact with any portion or member.

During heating, the web W is pulled upward by the dancer roller 5 while being held between the seal Jaws of the container forming device 9, whereby the web is tensioned as specified, Accordingly, the longitudinal edge portions of the web are unlikely sway during transport, and the web W is held at a predetermined distance from each of the nozzle 27 and the babble plate 32 while traveling between the intermediate forming roller ring 11 and the lower forming roller ring 12.

The hot air forced out from the nozzle 27 partly comes into contact with the inner surface of outer edge of the web W, whereby the polyethylene layer covering the surface is melted to a temperature suitable for heat sealing. The rest of the hot air advances straight as it is, and is deflected upon striking against the baffle plate 32. As a result, the hot air egressing from the nozzle 27 can be prevented from spreading out at a time although flowing inwardly and outwardly of the web W. The hot air is retained between the nozzle 27 and the baffle plate 32, and an atmosphere of high temperature is maintained in the vicinity of this region, heating the web W effectively.

When the transport of the web W is interrupted, the supply of hot air is not interrupted. If the device remains in the position indicated in solid lines in FIG. 4 in this case, the web W would be overheated with the hot air. To avoid this, the fluid pressure cylinder 42 is operated to rotate the shaft 24 counterclockwise in FIG. 4, moving the swing arm 25 and the hot air communication pipe 51 and retracting the nozzle 27 to the position indicated in broken lines in FIG. 4.

When the transport of the web W is to be resumed, the nozzle 27 is returned to the original position indicated in solid lines in FIG. 4. If the outer edge of the web W comes into contact with the nozzle 27 or the baffle plate 32 in this case, there is the likelihood that the polyethylene layer will be separated off from the outer edge of the web W, whereas the predetermined spacing provided between the web outer edge and each of the nozzle 27 and the baffle plate 32 obviates the likelihood.

The cutout of the baffle plate in the device described above may be formed at more than one portion of the plate, or a hole may be formed instead of the cutout.

What is claimed is:

1. A web heating device for use in forming a web into a tubular shape, and heat-sealing an inner surface of outer edge of the web and an outer surface of inner edge of the web to provide a lap, the web heating device being operable for heating the outer edge inner surface of the web with hot air before heat-sealing, said heating device comprising:

transporting means for transporting the web along a predetermined path;

a nozzle having hot air outlet openings directed outward as opposed to the outer edge inner surface of the web to be transported by said transporting means; and a baffle plate for deflecting said hot air so disposed as to be opposed to the hot air outlet openings with the outer edge of the web positioned therebetween, wherein said nozzle and said baffle plate is retractable from the outer edge and inner edge of the web.

2. A web heating device as defined in claim 1, wherein said web heating device further comprises tensioning means for tensioning the web so that the outer edge of the web can be positioned between and spaced apart from said nozzle and said baffle plate.

3. A web heating device as defined in claim 2, wherein said tensioning means comprises a dancer roller having the web reeved therearound and disposed on the path upstream from said nozzle with respect to the direction of transport of the web.

4. A web heating device as defined in claim 3 wherein the nozzle and the dancer roller are housed in an aseptic chamber.

5. A web heating device as defined in any one of claims 1 to 4 wherein the baffle plate is formed with a cutout or a hole for inspecting the web therethrough.

6. A web heating device for use in forming a web into a tubular shape, and heat-sealing an inner surface of outer edge of the web and an outer surface of inner edge of the web to provide a lap, the web heating device being operable for heating the outer edge inner surface of the web with hot air before heat-sealing, said heating device comprising:

transporting means for transporting the web along a predetermined path;

a nozzle having hot air outlet openings directed outward as opposed to the outer edge inner surface of the web to be transported by said transporting means;

tensioning means for tensioning the web so that the outer edge of the web can be positioned between and spaced apart from said nozzle and said baffle plate, wherein said tensioning means comprises a dancer roller having the web reeved therearound and disposed on the path upstream from said nozzle with respect to the direction of transport of the web; and a baffle plate for deflecting said hot air so disposed as to be opposed to the hot air outlet openings with the outer edge of the web positioned therebetween, wherein said nozzle and said baffle plate is retractable from the outer edge and inner edge of the web and wherein said nozzle and said dancer roller are housed in an aseptic chamber.

* * * * *